L. RICE.
Broadcast-Seeder.
No. 372.
Patented Aug. 31, 1837.
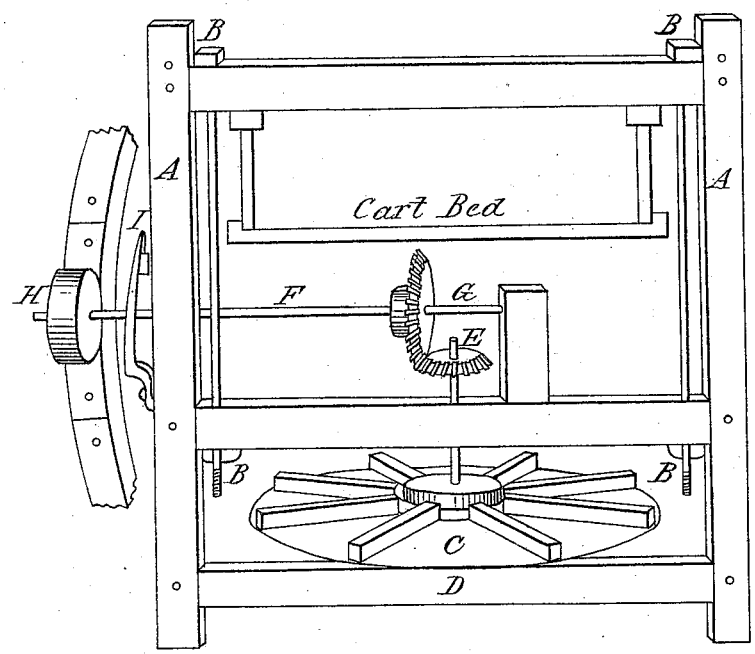

UNITED STATES PATENT OFFICE.

LEVI RICE, OF WEST CHESTER, PENNSYLVANIA.

IMPROVEMENT IN THE MACHINE FOR SPREADING AND SOWING LIME, PLASTER, SMALL GRAIN, &c.

Specification forming part of Letters Patent No. 372, dated August 31, 1837.

*To all whom it may concern:*

Be it known that I, LEVI RICE, of West Chester, Chester county, and State of Pennsylvania, have invented a new centrifugal disseminator for spreading lime, plaster, manure, composts, &c., and for sowing oats or other small grain; and I do hereby declare that the following is a full and exact description.

The utility of my invention consists in the advantage of spreading lime, plaster, &c., by the centrifugal force of a horizontally-revolving platform attached to a cart or other vehicle, which force is derived from the progressive motion of said cart, by means of a friction-pulley on a driving-shaft pressed to the periphery of the cart-wheel by a lever.

In order to enable a workman to construct one of my centrifugal disseminators, a frame, A, must be made of sufficient strength for the work required; and it consists of two uprights with two or more girts placed horizontally and secured to the cart by bolts and screws B, the upper one of which rests on the top rail of the cart, the lower girts being under its bed, and support the shafts of the revolving platform C, which may be about four feet diameter, made of sheet-iron or board, and has radiating cleats to strengthen the platform and give additional force to the distribution of materials. The lower pivot of the upright shaft, which passes through the center of the platform, rests on the lower girt, D. A horizontal driving-shaft, F, is so placed that a cog-wheel, G, thereon may work into a pinion, E, placed on the upright shaft, the upper part of which is steadied by the frame. On the outward end of the driving-shaft is placed a friction-pulley, H, which is pressed against the periphery of the cart-wheel by means of a lever, 1, attached to the frame, by the friction of which pulley the revolving platform is made to disseminate whatever is placed thereon when the cart is drawn by oxen, horses, or other means.

The lime, plaster, &c., is loaded into the cart, and when drawn to the spot where it is to be spread is directed by a man with a spade into an aperture or hopper, through which it passes onto the center of the platform under the cart-bed, which by its centrifugal force distributes it in all directions, spreading a swath ten or more feet in width.

What I claim as my invention, and desire to secure by Letters Patent, is—

The application of the centrifugal force to disseminate lime, plaster, &c., and small grain in the manner herein described.

LEVI RICE.

Witnesses:
ROBT. IRWIN,
GEO. D. CALLANAN.